(12) United States Patent
Whitman

(10) Patent No.: US 8,523,621 B2
(45) Date of Patent: Sep. 3, 2013

(54) COVER FOR INFLATABLE TUBE

(76) Inventor: Lucian D. Whitman, Kernville, CA (US)

( * ) Notice: Subject to any disclaimer, the term of this patent is extended or adjusted under 35 U.S.C. 154(b) by 188 days.

(21) Appl. No.: 13/213,829

(22) Filed: Aug. 19, 2011

(65) Prior Publication Data

US 2012/0058696 A1    Mar. 8, 2012

Related U.S. Application Data

(60) Provisional application No. 61/379,591, filed on Sep. 2, 2010.

(51) Int. Cl.
*B63B 35/73* (2006.01)

(52) U.S. Cl.
USPC ............... 441/66; 114/345; 114/346; 441/67; 441/131

(58) Field of Classification Search
USPC .................... 114/345, 346, 361; 441/66, 67, 441/129, 131
See application file for complete search history.

(56) References Cited

U.S. PATENT DOCUMENTS

| | | |
|---|---|---|
| 2,036,548 A | 4/1936 | Silvernail |
| 3,628,206 A | 12/1971 | Mecham |
| 3,871,042 A | 3/1975 | Farmer |
| 4,635,581 A | 1/1987 | Scheurer |
| 4,858,550 A | 8/1989 | Bellia |
| 5,279,510 A | 1/1994 | Remy |
| 5,383,804 A | 1/1995 | Mitch et al. |
| D384,720 S | 10/1997 | Spomer |
| 6,368,171 B1 | 4/2002 | Fuller et al. |
| 6,648,707 B1 | 11/2003 | Peterson |
| 6,881,114 B2 * | 4/2005 | Zheng ........................ 441/129 |
| 6,896,569 B1 | 5/2005 | Wittenrich |
| 7,380,802 B1 | 6/2008 | Kramer |
| 8,187,047 B1 * | 5/2012 | Brooks ........................ 441/131 |

FOREIGN PATENT DOCUMENTS

CN    2130764 Y    4/1993

OTHER PUBLICATIONS

Toobtop—Inner tube Covers, Toob covers Website: http://toobcovers.com/buy-a-toobtop/.
River Tube Cover, Tube Pro Inc. Website: www.tubeproinc.com/product.php?view=87.
Innovative Max Strength Inner Tube Cover, On-Line Scuba Website: www.onlinescuba.com/Product.aspx?ProductId7325&AdID=62-- 8568.
SportsTube,X-treme Tubing Website; www.sportstube.com/tubcover.htm.
Commercial. Ski Resort Snow Tubes, Tube Pro inc. Website: www.tubeproinc.com/m/content/article.php?content id=7.

\* cited by examiner

*Primary Examiner* — Lars A Olson
(74) *Attorney, Agent, or Firm* — Richard C. Litman

(57) ABSTRACT

The cover for inflatable tube includes a hollow, toroidal member made from a durable, puncture-resistant, abrasion-resistant fabric, the toroidal member being adapted for covering an inflatable float tube. The cover may also include a plurality of spaced, elongate, flexible eyelets are formed about a periphery of the cover portion on the outer surface and are arranged to extend radially about the periphery of the cover. The cover may further include a flat bottom member the extends across the annular opening defined by the toroidal member, providing a flat surface so that the tube may be used for sledding on snow-covered surfaces, or to prevent swimmers from extending their torsos through the tube, thereby permitting the swimmers to sit on the bottom sheet instead of dangling their feet below the tube, presenting the risk that the swimmer's foot may be entrapped by underwater obstructions in a river or other shallow water.

18 Claims, 4 Drawing Sheets

COVER FOR INFLATABLE TUBE

CROSS-REFERENCE TO RELATED APPLICATION

This application claims the benefit of U.S. Provisional Patent Application Ser. No. 61/379,591, filed Sep. 2, 2010.

BACKGROUND OF THE INVENTION

1. Field of the Invention

The present invention relates to protective covers, and particularly to a cover for inflatable tube that provides a protective cover for a floatation tube used for recreation, e.g. whitewater rafting, or for sliding in the snow, or for other recreational use where a tough, durable cover may be required.

2. Description of the Related Art

Inflatable float tubes for use on water and snow are known. However, such inflatable float tubes are thin-skinned and easily punctured. They also have a hole in the middle that makes them hard to use in the snow. In addition, the hole in the middle of the tube has the potential to permit people floating in a river or the like to slip though and sometimes totally lose their grip on the tube. The hole further creates an increased risk of foot entrapment while floating in a river with the user's torso disposed through the opening.

Thus, a cover for an inflatable tube solving the aforementioned problems is desired.

SUMMARY OF THE INVENTION

The cover for inflatable tube includes a hollow, toroidal member made from a durable, puncture-resistant, abrasion-resistant fabric, the toroidal member being adapted for covering an inflatable float tube. The cover may also it a plurality of spaced, elongate, flexible eyelets are formed about a periphery of the cover portion on the outer surface and are arranged to extend radially about the periphery of the cover. The cover may further include a flat bottom member the extends across the annular opening defined by the toroidal member, providing a flat surface so that the tube may be used for sledding on snow-covered surfaces, or to prevent swimmers from extending their torsos through the tube, thereby permitting the swimmers to sit on the bottom sheet instead of dangling their feet below the tube, presenting the risk that the swimmer's foot may be entrapped by underwater obstructions in a river or other shallow water.

The eyelets permit rope anchors attached to the tube to extend through the cover so that a reinforcing rope may be wrapped circumferentially around the outside of the cover, the rope being extendable through the rope anchors. The cover may also have an eyelet or grommet extending around an opening therein that permits access to a valve in the tube so that the tube can be inflated with the cover in place. When the cover includes the flat bottom sheet, the bottom sheet may have a plurality of round holes formed therein to allow water to easily pass in and out of the enclosed bottom of the tube cover.

These and other features of the present invention will become readily apparent upon further review of the following specification and drawings.

DETAILED DESCRIPTION OF THE PREFERRED EMBODIMENTS

Figure 1:
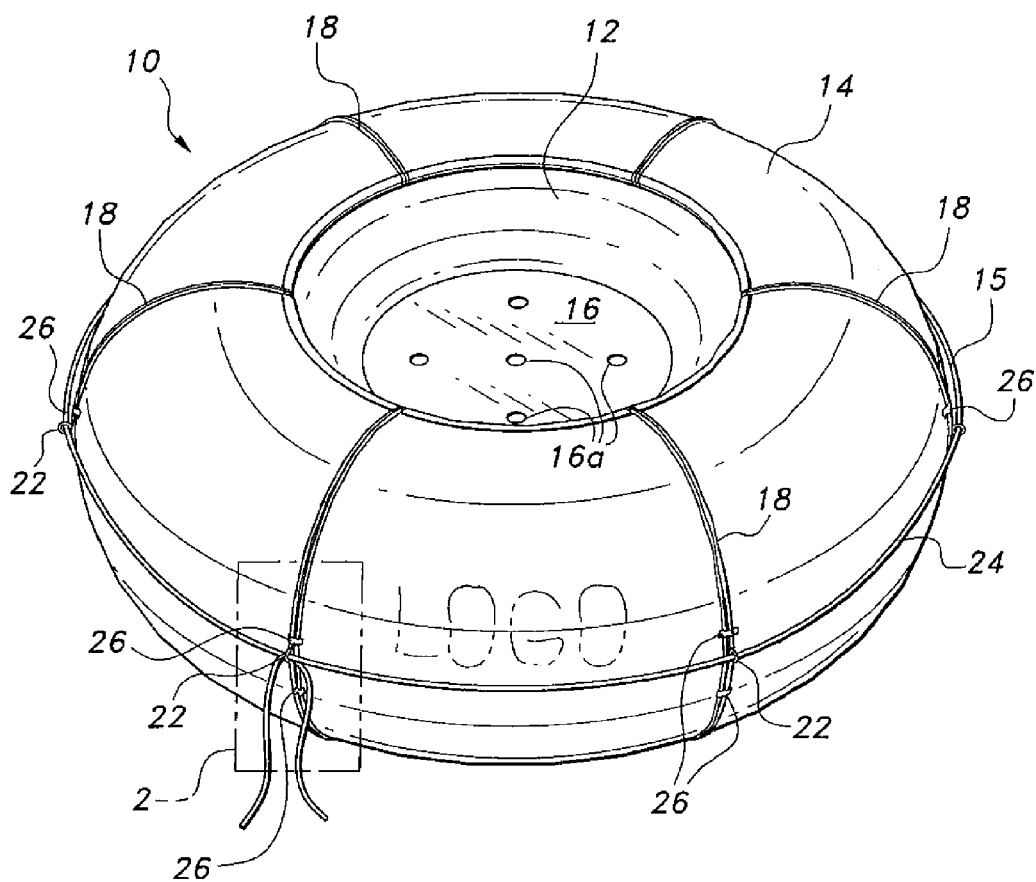
FIG. 1 is an environmental perspective view of a first embodiment a cover for an inflatable tube according to the present invention.
Figure 2:
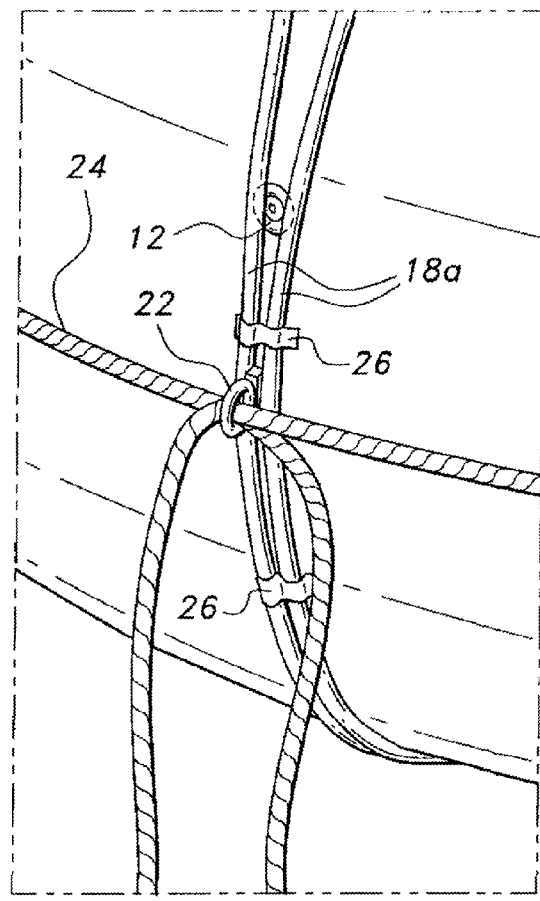
FIG. 2 is an enlarged view of a portion enclosed in the square II depicted in FIG. 1.
Figure 4:
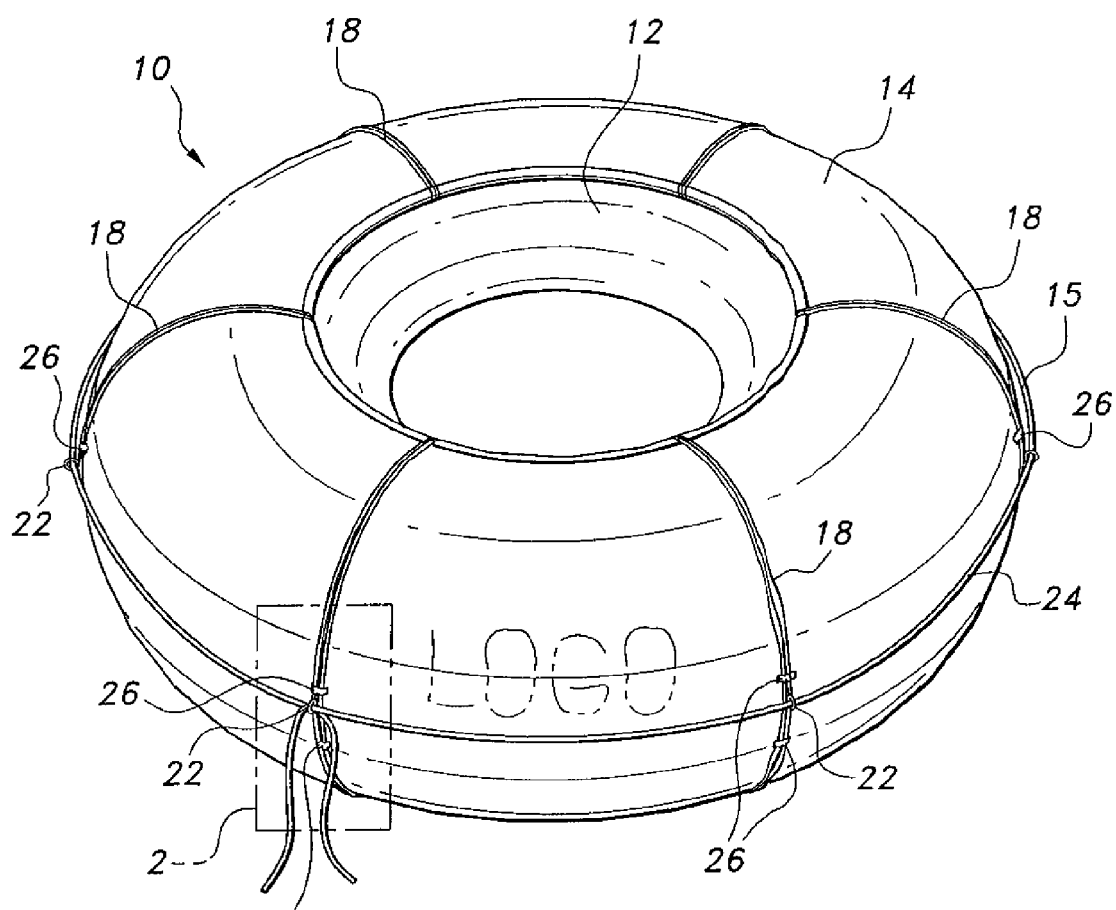
FIG. 4 is a perspective view of an alternative embodiment of a cover for an inflatable tube according to the present invention Similar reference characters denote corresponding features consistently throughout the attached drawings.

Referring to FIGS. 1 and 4, the cover for an inflatable float tube, designated generally as 10 in the drawings, is an outer cover for an inflatable float tube 12 or inner tube, which is a tube intended for recreational use on either water or snow. This type of inflatable float tube, as noted above, while popular, can be punctured upon colliding/encountering sharp or pointy objects, such as rocks, driftwood or like, and is not suitable for heavy duty use in rivers or in the snow. The tube cover 10 snugly fits over the tube 12, and provides a tough, durable shell for rough, heavy-duty enjoyment.

Figure 3:
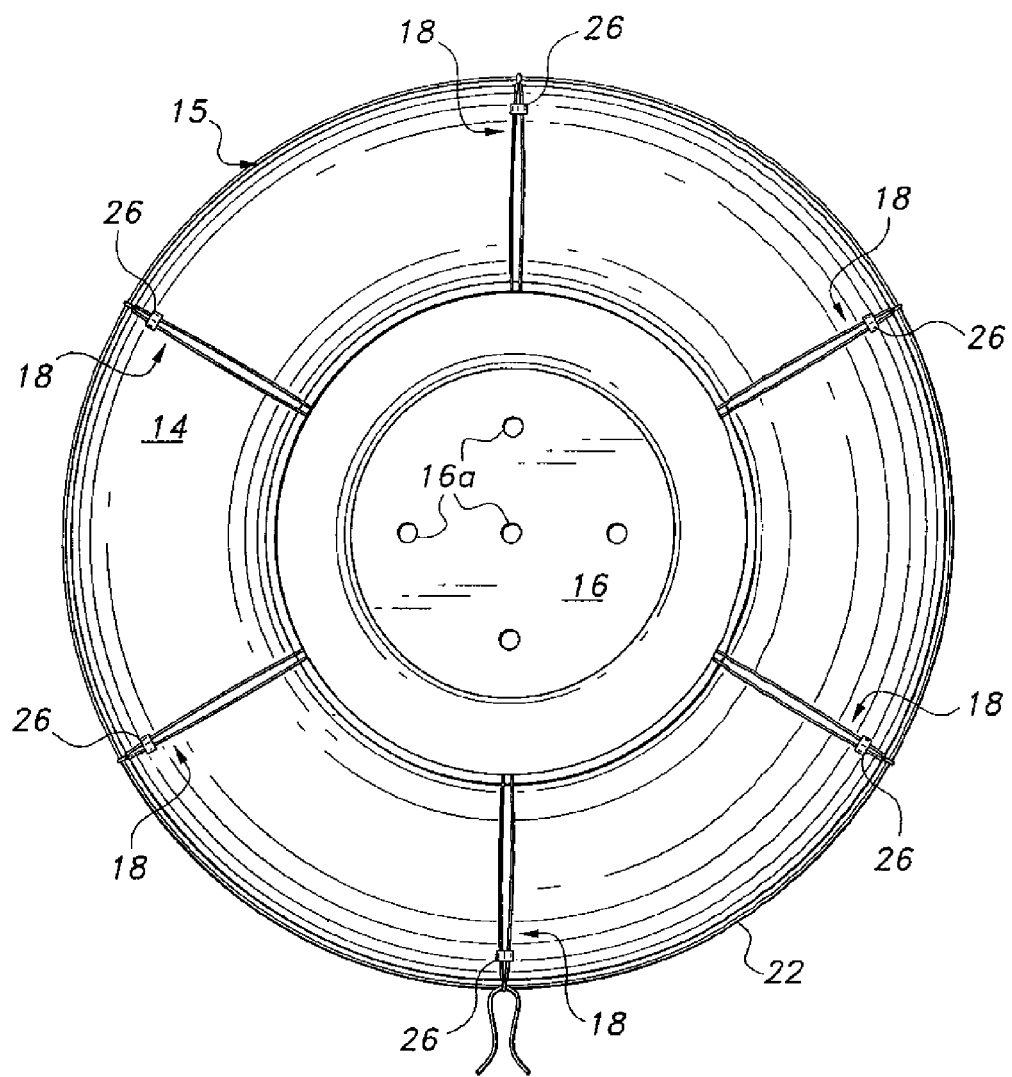
FIG. 3 is a top plan view of the arrangement depicted in FIG. 1.

As shown in FIG. 4, the cover 10 includes a hollow outer toroidal member 14 and, as shown in FIG. 1, may also include a bottom member 16 extending across the annular opening defined by the toroidal member 14. The bottom member 16 takes the form of a circular fabric, between 3 and 5 feet in diameter, and is intended to facilitate gliding over snow when used on snowy surfaces. The bottom member 16 can be made of a plastic laminated fabric, or alternatively, can be made of nylon or other abrasion-resistant fabric, and is sewn, bonded or welded to the toroidal outer member 14, such as at 15 (see FIG. 3). Several holes 16a, provided in strategic places, can be formed in the bottom member 16 to allow for water drainage when the tube is adapted for use on water as a float tube. The bottom member 16 may be a single layer or flat sheet of material, or may be multiple layers of material laminated together, and may include a filler of cushion material, such as foam, so that the covered tube may be used as a cushioned seat, or may encapsulate insulation, so that the cushioned tube may be used as a cooler.

In the illustrated embodiments, the toroidal outer member 14 is fabricated to enclose the tube 12 in a relatively snug manner and functions to protect the tube from abrasions and the like, which may puncture the same. This toroidal outer member 14 may be made of a plastic laminated fabric, nylon, or other robust fabric, or an abrasion-resistant and puncture resistant material, such as polypropylene. The toroidal outer member 14 may be made from an upper half and a lower half that are permanently joined around the tube 12 by sewing, welding, adhesive, or other joining methods, or may be releasably joined together by a suitable fastener, such as a zipper, so that the toroidal outer member 14 may be turned inside out and fastened around the tube 12, if desired. A representative or exemplary dimension for the toroidal outer member 14 is an outer diameter of between three feet and five feet.

Elongate eyelets 18, which, in this instance, are evenly spaced around the toroidal outer member 14, allow for access to the valve or valves 20 of the tube and allow rope anchors or attachments 22 on the tube 12 to extend therethrough. It will be understood that the spacing of the eyelets 18 is such as to coincide with the spacing of the rope attachments 22, and thus facilitates the projection of each the rope attachments 22 through a corresponding eyelet 18.

This spacing enables the tube's rope 24 to be threaded through the rope anchors 22, as shown in FIG. 1, while being entirely outside the top cover 10, and to extend about the circumference of the toroidal outer member 14. Apart from providing the user with ready and convenient access to the rope 24, which could prove invaluable in emergency situations or the like, the rope 22 effectively lashes the toroidal outer member 14 onto the tube 12, thus ensuring that unintentional removal of the cover 10 from the tube 12 is greatly attenuated, if not entirely prevented.

The rope attachments 22, in this instance, may be made of rubber or the like type of resilient material, which is sufficiently soft as to not cause any injury to a user should he or she come into contact with the same during recreational activities. The rope attachments are not limited to the illustrated arrangements and can take the form of a ring or the like which are pivotally connected to the tube 12.

The elongate eyelets 18 may be encircled with a grommet, if desired, and are reinforced with tape or webbing 18a, which is disposed along the opposite edges of the eyelets 18, and which is secured in place, such as by stitching, bonding or welding. To limit the amount that these buttonhole like eyelets 18 can flare open, the toroidal outer member 14 may be provided with reinforced, laterally extending cross members 26, which are stitched to the cover 10 at locations above and below the sites where the rope attachments 22 extend therethrough.

The toroidal outer member 14 and the bottom member 16 are secured together to create a fitted cover, such as by sewing, welding or gluing or a combination of these techniques.

The tube cover 10 protects the float tube from puncture or abrasion during use. As noted above, in some embodiments, the tube cover 10 may be turned inside out and will provide the same function.

As noted above, uses of embodiments may include float tubing in water and snow recreation. When equipped with the bottom member 16, the user may sit face up in the tube 12 and float in water or slide in the snow. The float tube cover 10 may also be used as a floating cooler. Further, the cover 10 may, when turned upside down, also be used as a cushion for sitting on.

It is to be understood that the present invention is not limited to the embodiments described above, but encompasses any and all embodiments within the scope of the following claims.

I claim:

1. A cover for an inflatable tube, comprising a hollow toroidal outer member made from a durable, puncture-resistant and abrasion-resistant material, the outer member being adapted for covering an inflatable tube, the outer member having a plurality of rope anchor eyelets formed therein distributed radially about the circumference of the outer member, the plurality of eyelets being adapted for extending rope anchors on the circumference of the inflatable tube therethrough, the outer member having an additional outlet formed therein adapted for accessing an inflation valve on the tube, and reinforcement crossmembers extending on the toroidal outer member above and below the circumferentially spaced rope anchor eyelets.

2. The cover for an inflatable tube according to claim 1, further comprising a bottom member extending across an annular opening defined by the toroidal outer member, the bottom member being made from a durable, puncture-resistant and abrasion-resistant material.

3. The cover for an inflatable tube according to claim 2, wherein said bottom member has a plurality of drainage holes extending therethrough.

4. The cover for an inflatable tube as set forth in claim 1, wherein the eyelets each have edges reinforced with tape fastened to the toroidal outer member.

5. The cover for an inflatable tube as set forth in claim 1, wherein each said crossmember comprises a member spanning the eyelet and limiting opening of the eyelet.

6. The cover for an inflatable tube as set forth in claim 5, wherein each said crossmember is stitched to the toroidal outer member.

7. The cover for an inflatable tube as set forth in claim 1, further comprising an inflatable toroidal floatation tube disposed inside the toroidal outer member, the tube having a plurality of rope anchors extending therefrom at radially spaced intervals about its circumference and an inflation valve disposed therein.

8. The cover for an inflatable tube as set forth in claim 7, further comprising a rope extending through the rope anchors and around the circumference of the outer toroidal member.

9. The cover for an inflatable tube as set forth in claim 7, wherein said toroidal outer member comprises an upper half and a lower half permanently joined to each other about the floatation tube.

10. The cover for an inflatable tube as set forth in claim 1, wherein said toroidal outer member comprises an upper half and a lower half releasably joined to each other, whereby the outer member may be turned inside out and disposed around the tube.

11. The cover for an inflatable tube as set forth in claim 1, wherein said toroidal outer member is made from nylon.

12. The cover for an inflatable tube as set forth in claim 1, wherein said toroidal outer member is made from an abrasion-resistant and puncture-resistant plastic material.

13. A cover for an inflatable tube, comprising:
   a hollow toroidal outer member made from a durable, puncture-resistant and abrasion-resistant material, the outer member being adapted for covering an inflatable tube, the outer member having a plurality of rope anchor eyelets formed therein distributed radially about the circumference of the outer member, the plurality of eyelets being adapted for extending rope anchors on the circumference of the inflatable tube therethrough, the outer member having an additional outlet formed therein adapted for accessing an inflation valve on the tube;
   a bottom member extending across an annular opening defined by the toroidal outer member, the bottom member being made from a durable, puncture-resistant and abrasion-resistant material; and
   reinforcement crossmembers extending on the toroidal outer member above and below the circumferentially spaced rope anchor eyelets.

14. The cover for an inflatable tube according to claim 13, further comprising a rope adapted for extending through the rope anchors and around the circumference of the outer toroidal member.

15. The cover for an inflatable tube according to claim 13, wherein said bottom member has a plurality of drainage holes extending therethrough.

16. A covered inflatable floatation tube, comprising:
   an inflatable toroidal floatation tube having a plurality of rope anchors extending therefrom at radially spaced intervals about its circumference and an inflation valve disposed therein;
   a hollow toroidal outer member made from a durable, puncture-resistant and abrasion-resistant material, the outer member covering the floatation tube, the outer member having a plurality of rope anchor eyelets formed therein distributed radially about the circumference of the outer member, the rope anchors on the floatation tube being extendable through the rope anchor eyelets, the outer member having an additional outlet formed therein for accessing the inflation valve on the tube, wherein the eyelets each have edges reinforced with tape fastened to the toroidal outer member; and a bottom member extending across an annular opening defined by the toroidal outer member, the bottom member being made from a durable, puncture-resistant and abrasion-resistant material;

whereby the covered inflatable floatation tube is adapted for alternately floating on water and for sledding on snow.

17. The covered inflatable floatation tube according to claim 16, further comprising a rope extending through the rope anchors and around the circumference of the outer toroidal member.

18. The covered inflatable floatation tube according to claim 16, wherein said bottom member has a plurality of drainage holes extending therethrough.

* * * * *